(12) United States Patent
Wiklund et al.

(10) Patent No.: US 10,704,945 B2
(45) Date of Patent: Jul. 7, 2020

(54) CORRECTION OF NATURAL GAS FLOW CALCULATIONS FOR THE EFFECTS OF WATER VAPOR

(71) Applicant: Rosemount Inc., Shakopee, MN (US)

(72) Inventors: David Eugene Wiklund, Eden Prairie, MN (US); Dale Scott Davis, Prior Lake, MN (US)

(73) Assignee: ROSEMOUNT INC., Shakopee, MN (US)

( * ) Notice: Subject to any disclaimer, the term of this patent is extended or adjusted under 35 U.S.C. 154(b) by 155 days.

(21) Appl. No.: 15/216,871

(22) Filed: Jul. 22, 2016

(65) Prior Publication Data

US 2017/0023393 A1 Jan. 26, 2017

Related U.S. Application Data

(60) Provisional application No. 62/195,621, filed on Jul. 22, 2015.

(51) Int. Cl.
| | |
|---|---|
| *G01F 15/02* | (2006.01) |
| *G01F 1/50* | (2006.01) |
| *G01F 15/04* | (2006.01) |
| *G01F 1/74* | (2006.01) |
| *G01F 1/88* | (2006.01) |

(52) U.S. Cl.
CPC ............ *G01F 15/022* (2013.01); *G01F 1/50* (2013.01); *G01F 1/74* (2013.01); *G01F 1/88* (2013.01); *G01F 15/04* (2013.01)

(58) Field of Classification Search
CPC .......... G01F 15/022; G01F 15/04; G01F 1/50; G01F 1/74; G01F 1/88; G01F 23/0007
See application file for complete search history.

(56) References Cited

U.S. PATENT DOCUMENTS

| | | | |
|---|---|---|---|
| 8,042,409 B2 | 10/2011 | Moller | |
| 8,209,039 B2 | 6/2012 | Davis et al. | |
| 8,812,253 B2 * | 8/2014 | Davis | G01F 1/88 |
| | | | 702/100 |
| 2008/0034889 A1 | 2/2008 | Moller | |

(Continued)

FOREIGN PATENT DOCUMENTS

| | | |
|---|---|---|
| CN | 1934427 | 3/2007 |
| CN | 102171620 | 8/2011 |

(Continued)

OTHER PUBLICATIONS

Flatau, Piotr J, et al., "Polynomial Fits to Saturation Vapor Pressure," Journal of Applied Meteorology, vol. 31, Dec. 1992, pp. 1507-1513 (Year: 1992).*

(Continued)

*Primary Examiner* — Leslie J Evanisko
*Assistant Examiner* — Leo T Hinze
(74) *Attorney, Agent, or Firm* — Westman, Champlin & Koehler, P.A.

(57) ABSTRACT

A system for measuring concentration of water vapor in a gas includes a pressure sensor configured to sense a static pressure of the gas and a differential pressure sensor configured to sense a differential pressure. A temperature sensor senses a temperature of the gas. Circuitry estimates determines a concentration of water vapor in the gas based upon the measured pressures and temperature.

18 Claims, 3 Drawing Sheets

(56) References Cited

U.S. PATENT DOCUMENTS

2010/0082122 A1    4/2010  Davis et al.
2011/0301867 A1*  12/2011  Davis .................. G01F 1/88
                                                      702/30

FOREIGN PATENT DOCUMENTS

| | | |
|---|---|---|
| EP | 2 347 224 | 7/2015 |
| GB | 654335 A | 6/1951 |
| JP | 2004020523 A | 1/2004 |
| JP | 2004020524 A | 1/2004 |
| JP | 4094899 | 6/2008 |
| KR | 20100047055 | 5/2010 |
| KR | 20100047055 A | 5/2010 |

OTHER PUBLICATIONS

Brown, Theodore L., et al., "Chemistry," Prentice Hall, Seventh Edition, 1997, pp. 360, 361 (Year: 1997).*

International Search Report Issued for corresponding Patent Application No. PCT/US2016/043584, dated Nov. 11, 2016.

Zhu Lin et al., "Formula calculation methods of water content in sweet natural gas and their adaptability analysis", Natural Gas Industry B, Nov. 29, 2014, vol. 1, No. 2, pp. 144-149.

Totalflow® 6713 Flow Computer User's Manual, Totalflow Prodcuts, Bartlesville, OK, 1999.

Communication from European Patent Application No. 16754343.8, dated Mar. 1, 2018.

Office Action from Chinese Patent Application No. 201680000956.9, dated Nov. 5, 2018.

Office Action from Canadian Patent Application No. 2,992,990, dated Nov. 27, 2018.

Office Action from Japanese Patent Application No. 2018-502817, dated Dec. 18, 2018.

Communication from European Patent Application No. 16754434.8, dated Jun. 14, 2019.

Office Action from Chinese Patent Application No. 201680000956.9, dated Aug. 1, 2019.

Communication from European Patent Application No. 16754343.8, dated Mar. 17, 2020.

* cited by examiner

CORRECTION OF NATURAL GAS FLOW CALCULATIONS FOR THE EFFECTS OF WATER VAPOR

CROSS-REFERENCE TO RELATED APPLICATION

The present application is based on and claims the benefit of U.S. provisional patent application Ser. No. 62/195,621, filed Jul. 22, 2015, the content of which is hereby incorporated by reference in its entirety.

BACKGROUND

The present invention relates to measurement of flow of a gas. More specifically, the invention relates to the effects of water vapor present in the flow on such measurements.

Government regulations are placing increasing constraints on energy producers to account for greenhouse gas content during production. For example, the natural gas industry must account for $CO_2$ emissions. In many applications there is water vapor present in the pipe which is not identified during a gas chromatograph analysis of the "dry gas" composition.

Natural gas mixtures flowing from wells typically consist of a combination of a number of gas species. Some are hydrocarbon gases such as methane, ethane, propane, etc. which are the desirable products. Others are by-products such as carbon dioxide, nitrogen, etc. which have less value. One of these by-product gases, carbon dioxide, is particularly important in that it is one of the "greenhouse gases" that contributes to global warming. There is increasing interest through government regulations in quantifying the emission of carbon dioxide. In order to comply with such regulations natural gas producers are becoming increasingly interested in the amount of carbon dioxide they pump out of wells.

One of the things that is done to reduce the uncertainty in natural gas flow measurement is to obtain an accurate gas composition by analyzing samples of the gas from a given well. These samples are typically obtained with some regularity at the beginning of the life of a well. However, the frequency of sampling decreases as it becomes apparent that the gas composition can be considered to be fixed. It is important to note that the gas composition is obtained by taking a sample of the gas to a laboratory and analyzing it with a gas chromatograph or other such devices. The resulting composition is what is considered a "dry gas" composition. This means that there is no water vapor content in the gas. The equation of state used in the natural gas industry, AGA (American Gas Associate) Report No. 8, can account for water vapor.

However, this is rarely included in gas composition reports. In fact, the six example compositions given in AGA Report No. 8 contain no water content.

As the pressure in a well reduces with age due to depletion of the gas in the field, measures such as steam injection are often used to force gas and oil from the ground. When this is done the gas produced now contains water vapor in addition to the gases present in the dry gas composition. This means that in a given volume some of the dry gas is replaced by water vapor. Since the flow rate is measured based on the dry gas composition the measurements will overstate the amount of all gases, including carbon dioxide.

SUMMARY

A system for measuring concentration of saturated water vapor in a gas includes a pressure sensor configured to sense a static pressure of the gas and a differential pressure sensor configured to sense a differential pressure. A temperature sensor senses a temperature of the gas. Circuitry determines a concentration of water vapor in the gas based upon the measured pressures and temperatures.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
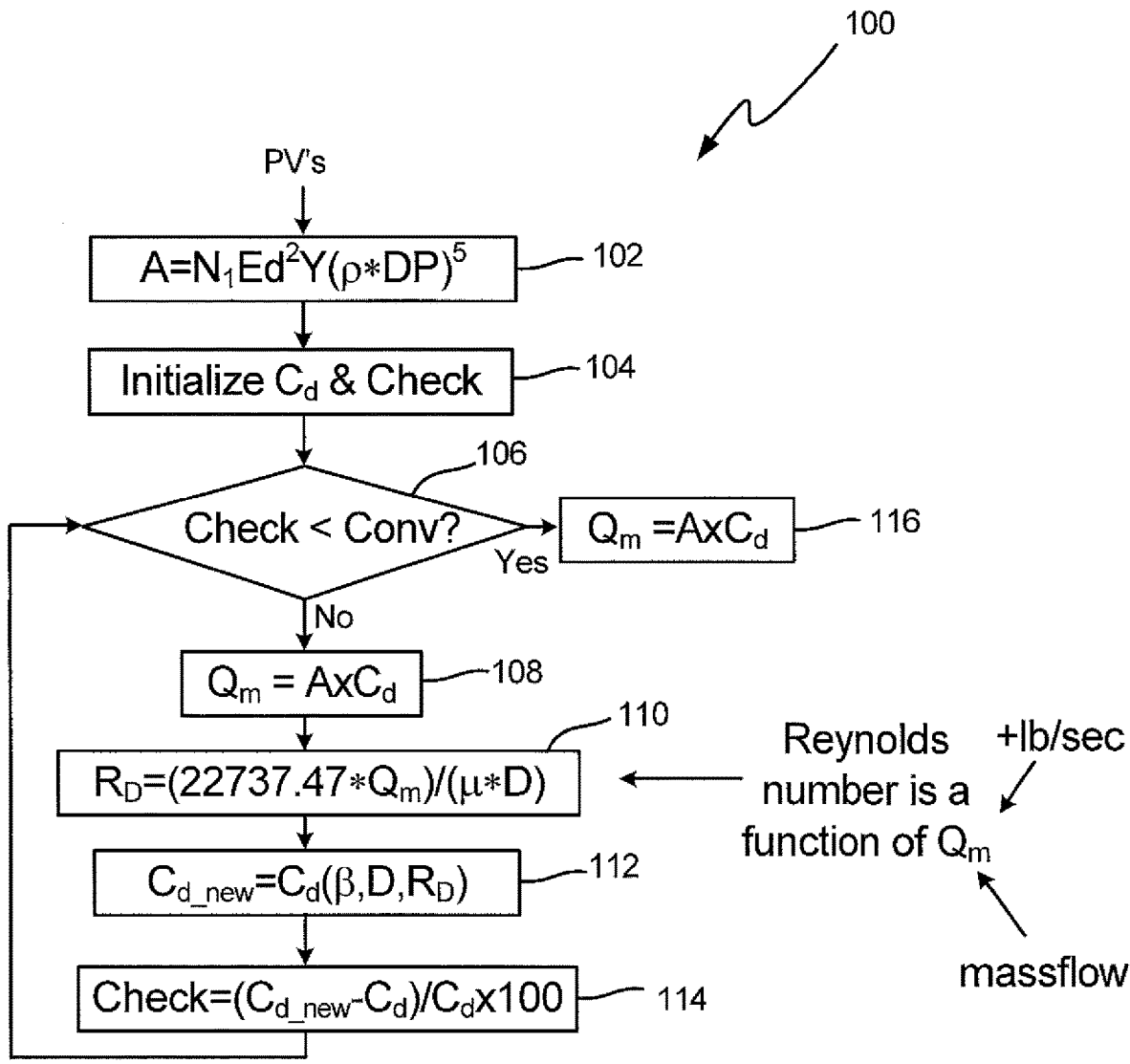
FIG. 1 is a simplified block diagram of an iterative technique for determining mass flow.

Process variable transmitters are used to measure process variables in industrial processes. One type of process variable transmitter measures a differential pressure created by a flow of a process fluid which can be correlated to flow of the process fluid. When used to measure a "dry gas" (one in which water or water vapor is not present), standard measurement techniques may be implemented. However, when measuring flow of a "wet gas", errors are introduced into the measurement by not accounting for the water vapor content. As used herein, the term "wet gas" refers to gasses which contain water only in its vapor phase rather than in a liquid phase. The water vapor is present at saturated vapor conditions. The water vapor will introduce errors in the measurement of process variables of the gas composition such as in the determination of flow of individual components of the gas. For example, with water vapor present, in most cases the raw flow measurement will indicate the amount of gas flowing is greater than it actually is. However, there is no simple way to accurately adjust the flow rates and flow totals based on an assumption of the amount of water vapor present in the gas mixture.

Techniques are known in the art for determining flow of a gas. For example, mass flow ($Q_m$) in units of mass/unit time can be determined based upon differential pressure, pressure, temperature and pipe diameter. Mass flow can be converted into desired units such as pounds per hour or kilograms per day, by scaling factors. Standard volume flow rate (Qv) is the mass flow rate, in units of mass/unit time, divided by the fluid density at reference or standard conditions. It is, thus, mass flow expressed in units of standard cubic feet/unit time. Energy flow represents the amount of energy provided per unit time and, for example, is used in steam and natural gas systems. For steam, energy flow is the enthalpy for natural gas, the energy flow is related to the heating value.

Mass Flow Rate of Natural Gas with Saturated Water Vapor

When mass flow units (lbm/unit time) are used the flow equation is:

$$Q_{m\_wv} = N_1 C_d E d^2 Y_1 \sqrt{DP} \sqrt{P_f/T_f} \left[ \sqrt{\frac{Mr_{wv}(P_f, T_f)}{R Z_{f\_wv}(P_f, T_f)}} \right] \quad \text{Equation 1}$$

Where: $N_1$=Units conversion factor
$C_d$=Orifice discharge coefficient
E=Velocity of approach factor ($1/\sqrt{1-\beta^4}$); $\beta = d_{orifice}/D_{pipe}$
d=Orifice diameter
$Y_1$=Gas expansion factor
DP=Differential pressure
$P_f$=Absolute static fluid pressure at flowing conditions
$T_f$=Absolute fluid temperature at flowing conditions
$Mr_{wv}$=Molecular weight of the gas mixture with water vapor and is a function of pressure ($P_f$) and temperature ($T_f$)
R=Gas constant
$Z_{f\_wv}$=Flowing compressibility factor of the gas mixture with water vapor and is a function of pressure ($P_f$) and temperature ($T_f$)

The value of $N_1$ is set by the choice of the units for the other parameters and the time base selected for the flow rate. The term in [ ] would be the parameter calculated using a curve fit approximation if that was desired.

In conventional applications the gas mixture does not change. The molecular weight of the dry gas mixture, based on the mole fractions of the dry gas is:

$$Mr_{mix\_dry} = \Sigma_{i=1}^{N} x_{i\_dry} Mr_i \quad \text{Equation 2}$$

When saturated water vapor is present the mole fraction of water vapor is calculated based on the saturated pressure of water vapor as:

$$x_{H2O}(P_f, T_f) = P_{satH2O}/P_f \quad \text{Equation 3}$$

Using the mole fraction of water vapor the corrected mole fractions of dry components are:

$$x_{i\_corr}(P_f, T_f) = \{1 - x_{H2O}(P_f, T_f)\} x_{i\_dry} \quad \text{Equation 4}$$

Then, the equation for molecular weight of the gas with water vapor:

$$Mr_{wv}(P_f, T_f) = \Sigma_{i=1}^{N} x_{i\_corr}(P_f, T_f) Mr_i + x_{H2O}(P_f, T_f) Mr_{H2O} \quad \text{Equation 5}$$

Standard Volume Flow Rate of Natural Gas with Saturated Water Vapor

When standard volume mass flow units (standard volume/unit time) are used the flow equation is:

$$Q_{V\_wv} = N_2 C_d E d^2 Y_1 \sqrt{DP} \sqrt{P_f/T_f}$$
$$\left[ Z_{b\_wv}(P_f, T_f) \sqrt{\frac{Mr_{air}}{Z_{b\_air} Mr_{wv}(P_f, T_f) Z_{f\_wv}(P_f, T_f)}} \right] \quad \text{Equation 6}$$

Where: $N_2$=Units conversion factor
$C_d$=Orifice discharge coefficient
E=Velocity of approach factor ($1/\sqrt{1-\beta^4}$); $\beta = d_{orifice}/D_{pipe}$
d=Orifice diameter
$Y_1$=Gas expansion factor
DP=Differential pressure
$P_f$=Absolute static fluid pressure at flowing conditions
$T_f$=Absolute fluid temperature at flowing conditions
$Mr_{wv}$=Molecular weight of the gas mixture with water vapor
$Mr_{air}$=Molecular weight of air (constant)
$Z_{f\_wv}$=Compressibility factor of the gas mixture with water vapor
$Z_{b\_air}$=Base compressibility factor of air (constant)
$Z_{b\_wv}$=Base compressibility factor of the gas mixture with water vapor The value of $N_2$ is set by the choice of the units for the other parameters and the time base selected for the flow rate. Some terms, such as the term in [ ], would be parameters calculated using a curve fit approximation if that was desired.

As for the mass flow rate, the presence of saturated water vapor changes the composition of the mixture at each pressure and temperature and the mole fractions are adjusted using the same relationships.

Flow Calculations with Saturated Water Vapor Present

When water vapor is present in the gas mixture but not accounted for in the flow calculations the result generally is an over-reporting of the flow rate of the various gas species present in the dry gas composition. In some cases, users are even assessed fines for the amount of the components released to the atmosphere. Thus, there is a desire to account for the water vapor and reduce the amount of the other components that must be reported. The reporting is generally done in units of lbm/day of these components.

When the flow rate is calculated in unit of lbm/unit time the determination of how many lbm/day of a component is discharged is calculated as follows:

1. Based on the values of $P_f$ and $T_f$, the mole fraction of water vapor $x_{H2O}$ is calculated.
2. The mole fraction of each of the components is adjusted per Equation 4.
3. The Molecular weight of the mixture is then calculated using Equation 5.
4. The Mass Fraction of each component is calculated using:

$$MF_i = \frac{x_{i\_corr} Mr_i}{Mr_{wv}(P_f, T_f)} \quad \text{Equation 7}$$

5. The mass flow of the desired component is calculated using:

$$Q_{m\_i} = Q_m \times MF_i \quad \text{Equation 8}$$

When the flow rate is calculated in units of standard volume/unit time the determination of lbm/unit time for each component is a bit more complicated. The first step is straightforward given that the volume fractions and the adjusted mole fractions of the various components are the same.

1. Calculate the volume fraction of the $i^{th}$ component as: The Mass Fraction of each component using:

$$VF_i = x_{i\text{-}corr} \quad \text{Equation 9}$$

2. Calculate the volume flow of a given component as:

$$Q_{v\_i} = VF_i \times Q_v \quad \text{Equation 10}$$

3. To convert $Q_{v\_i}$ from units of StdCuFt/unit time to lbm/unit time multiply by the base density of the component. The correct method uses the Real Gas Law which requires the base compressibility factor, which is different for every pressure and temperature. This can be calculated via a curve fit approximation if so desired. Then the mass flow of the $i^{th}$ component is calculated as:

$$Q_{m\_i} = Q_{V\_i} \times \frac{P_b Mr_i}{RZ_b(P_f, T_f)T_b} \quad \text{Equation 11}$$

4. If the base compressibility factor is not available the mass flow can be estimated using the Ideal Gas Law which will always result in a negative bias error. The expression for this calculation is:

$$Q_{m\_i\_IdealGas} = Q_{V\_i} \times \frac{P_b Mr_i}{RT} \quad \text{Equation 12}$$

Mass Flow Rate of Dry Fraction with Saturated Water Vapor

A simplified method for calculating the mass flow rate of the components involves the calculation of the mass flow rate of only components of the dry gas after they are first corrected for the water vapor content. Put another way, this method involves correcting for the water vapor as described above and then scaling the result to produce only the fraction that was due to the components in the dry gas composition. This method basically calculates the total mass flow rate and factors out the mass flow of water vapor by multiplying by the Mass Fraction of the other components.

The preferred method would be to do the calculations as described above for the mass flow rate and then multiply by the Mass Fraction of the dry gas components. This would give:

$$Q_{m\_wv} = N_1 C_d E d^2 Y_1 \sqrt{DP} \sqrt{P_f/T_f} \left[ \sqrt{\frac{Mr_{wv}(P_f, T_f)}{RZ_{f\_wv}(P_f, T_f)}} \right] \quad \text{Equation 13}$$

and then:

$$Q_{m\_wv\_DF} = Q_{m\_wv} \times \left\{ \frac{\sum_{i=1}^{N} x_{i\_corr} \times Mr_i}{\sum_{i=1}^{N} x_{i\_corr} \times Mr_i + x_{H2O} Mr_{H2O}} \right\} \quad \text{Equation 14}$$

A second method is to include this adjustment within the flow calculation algorithm using the following equation:

$$Q_{m\_wv\_DF} = N_1 C_d E d^2 Y_1 \sqrt{DP} \sqrt{P_f/T_f} \quad \text{Equation 15}$$

$$\left[ \left[ \frac{Mr_{wv}(P_f, T_f)}{RZ_{f\_wv}(P_f, T_f)} \right] \right\} \left\{ \frac{\sum_{i=1}^{N} x_{i\_corr} \times Mr_i}{\sum_{i=1}^{N} x_{i\_corr} \times Mr_i + x_{H2O} Mr_{H2O}} \right\} \right]$$

The N terms in the summations are the N components in the dry gas composition. In these equations the term in [ ] would again be the parameter calculated using a curve fit approximation. The term inside this in { } is simply the Mass Fraction of the components in the dry gas composition.

When this done the mass flow of each component is readily calculated using the Mass Fraction of the components and the molecular weight of the dry gas composition, a parameter typically supplied with the dry gas composition from the gas chromatograph. The calculation is then simply:

$$Q_{m\_i} = \frac{x_i \times Mr_i}{Mr_{dry}} \times Q_{m\_wv\_DF} \quad \text{Equation 16}$$

The second method will result in a small error because the density is not the correct density value.

This approach can also work for the Standard Volume calculation method but the issues related to the base density remain.

In order to determine mass flow, the discharge coefficient can be calculated using an iterative technique as illustrate in FIG. 1. The flow chart 100 show in FIG. 1 begins at block 102 in which process variables are received by the algorithm. The process variables include temperature, pressure and differential pressure. At block 102 a factor A is calculated which represents the portion of Equation 1 which will remain static during the interactive calculation used to calculate mass flow $Q_m$. At block 104 an initial discharge coefficient $C_d$ is set along with a desired convergence accuracy identified as "check." At block 106, the check value is compared with a desired convergence accuracy. If the check value is outside of the desired convergence range, control is passed to block 108 where an initial value of mass flow $Q_m$ is calculated. At block 110, the Reynolds number $R_D$ is calculated as a function the mass flow $Q_m$. Note, the constant value of 22737.47 is based upon $Q_m$ in units of lb/sec, D in units of inches, μ in units of centipoise and p in units of lb/ft³. A new value of the discharged coefficient is then calculated at block 112 as a function of the Reynolds number along with β which is $d_{orifice}/d_{pipe}$ and D which is the diameter of the pipe. At block 114, a new check value is calculated as a function of the newly calculated discharge coefficient to determine if the solution is sufficiently converged. Control then returns to block 106 and the process repeats until the solution has converged as desired. Once converged, control is passed to block 116 where a final value of mass flow $Q_m$ is determined.

This invention can be implemented using, for example, a configuration software application to compute the curve fit coefficients for the calculation of the gas mixture compressibility factor and molar mass term as a function of pressure and temperature. The fact that the flow calculation requires the square root of density, the parameter to curve fit is:

$$\sqrt{\frac{Mr(P_f, T_f)}{RZ(P_f, T_f)}} \quad \text{Equation 17}$$

In Equation 17 the term $M_r$ is the molar mass of the gas mixture and changes as a function of pressure and temperature. The Z term is the compressibility factor which is a function of gas composition, pressure and temperature.

There are several ways the options and results can be presented to the user. Since there is existing configuration software, such as the Engineering Assistant (EA) software for the 3051SMV Multivariable transmitter (available from Emerson Process Management of Shakopee, Minn.), users are accustomed to supplying a dry gas composition and having the 3051SMV compute the flow rate, energy rate and flow total based on the dry gas composition. One simple implementation would be to add a button such as a soft key or other input to the existing fluid composition screen in the EA. This button or other such selection option would let the user correct the flow calculations for the presence of water vapor.

Another example implementation provides the user with a display of the corrected gas composition and the dry composition at specified process conditions. Alternatively, a graph showing the correction factor for any specified component as a function of pressure and temperature could be displayed or provided as output. The transmitter or other flow computer can provide logged data for the uncorrected and corrected flow calculations. The logged data may include the P, T, Z, Flow Rate, Energy Rate and correction factor for both the uncorrected and corrected conditions.

Figure 2:
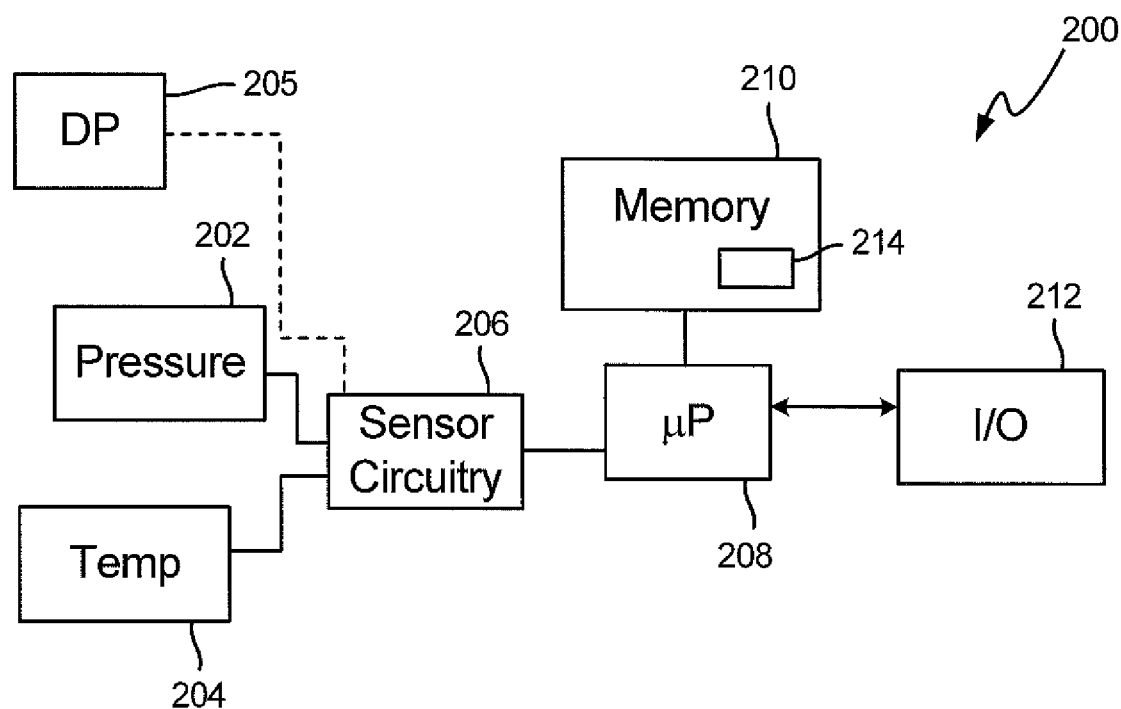
FIG. 2 is a simplified block diagram of a system for determining concentration of water vapor and a gas.

The present invention may be implemented in various configurations. FIG. 2 is a simplified block diagram of a system 200 for compensating a flow measurement due to water vapor in the gas. The system 200 includes a pressure sensor 202 and a temperature sensor 204 configured to sense pressure and temperature, respectively of a process fluid. A differential pressure sensor 205 is also shown which can be used for measuring flow of the process fluid. Sensor circuitry 206 converts the outputs from the pressure sensor 202 and the temperature sensor 204 into digital values for use by microprocessor 208. Microprocessor 208 operates in accordance with instructions stored in a memory 210 and communicates using input/output circuitry 212. The system 200 can be implemented in a single device such as a field device. An example field device is a process variable transmitter. In another configuration, the system 200 is implemented in a dispersed configuration in which process variable sensors placed in the field are used to obtain pressure and temperature measurements and the microprocessor 208 is implemented at another location, for example, in a centralized location such as a control room or the like. In one configuration, the memory 210 stores curve fit coefficients 214. The curve fit coefficients 214 may be used as discussed above to determine water vapor concentration in a gas using a low power implementation which relies up on curve fitting. If sufficient power is available, the water vapor concentration can be calculated directly. In general, the sensor circuitry 206, the microprocessor 208 and memory 210 are referred to as "measurement circuitry." If the pressure sensor 202 is also configured to measure a differential pressure, flow rate of the gas may be calculated as a function of differential pressure across the flow restriction. In such a configuration, the flow measurement can be compensated for water vapor in the gas.

Figure 3:
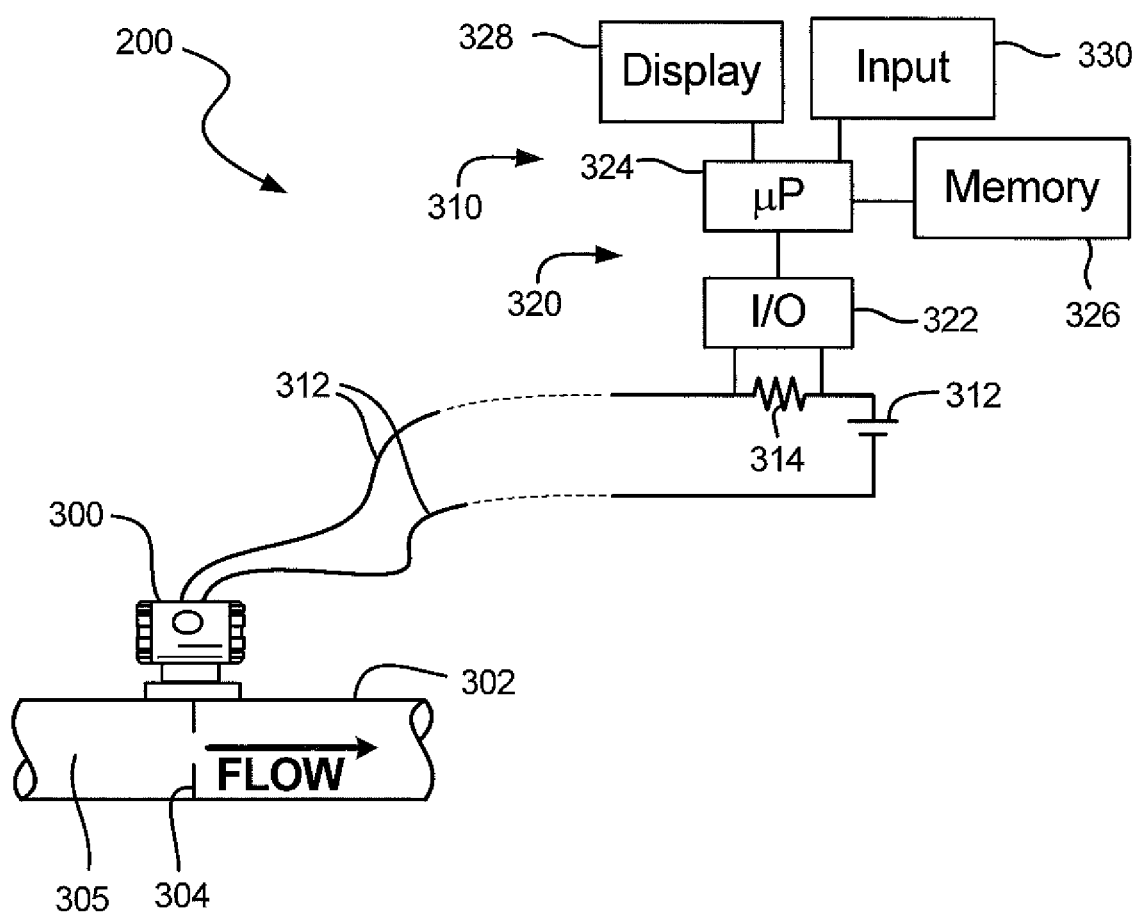
FIG. 3 is a diagram of a system for measuring flow of a process fluid and compensating the measurement based upon determined water vapor concentration.

FIG. 3 is a simplified block diagram of one configuration of system 200 in which a process variable transmitter 300 is mounted to process piping 302 and arranged to measure a differential pressure across a flow restriction 304. The differential pressure is related to the flow of process fluid 305 past the restriction 304. The process fluid comprises a gas including water vapor. The process variable transmitter is in communication with a central location such as a control room 310 through a process control loop such as two-wire process control loop 312. In such a configuration the same control loop 312 can be used both for communication as well as for powering the process variable transmitter 300. The control room is illustrated as including a power supply 312 and a sense resistor 314. A monitoring or configuration system 320 is illustrated and is configured to communicate over the two-wire process control loop 312 using I/O circuitry 322. System 320 includes a microprocessor 324 which operates in accordance with instructions stored in memory 326. A display 328 is provided along with a user input 330 for use by operator. In such a configuration, the microprocessor 208 and memory 210 illustrated in FIG. 2 may be implemented in transmitter 300. System 320 can be used to store the curve fitting coefficients 214 into the memory 210 during a configuration phase of the process variable transmitter 300. In another configuration, microprocessor 324 can be used to directly perform the determination of water vapor concentration in the gas 305. In another example configuration, element 310 comprises a configuration device such as a handheld configurator or control room equipment. Such a device 310 can be used to store curve fit coefficient 214 into memory 210 shown in FIG. 2.

As discussed, the presence of water vapor in the pipe changes the mole fraction of all constituents in the gas. This invention provides a system and method by which this reduction can be quantified by the user. PC-based configuration software can provide the option for calculating the parameters to correct the computed flow of dry natural gas mixtures. A transmitter-based calculation to correct the computed flow of dry natural gas mixtures for the effects of water vapor in the mixture can also be provided. The transmitter calculates the flow rate of dry and correct natural gas mixtures. The transmitter can provide logged data of the dry and corrected flow rate of natural gas mixtures. The transmitter provides logged data of the correction factor for carbon dioxide. PC-based configuration software provides an option to select which gas components for which the correction factor is provided on the screen and stored to memory. This information is provided as a function of pressure and temperature. The above features can also be implemented in a flow computer with computational power to perform the direct calculations. A system for measuring flow of a gas, includes a differential pressure sensor configured to sense a differential pressure of the gas which is related to flow. Measurement circuitry is configured to measure flow of the gas based upon the differential pressure and compensate for water vapor in the gas. A system for measuring concentration of water vapor in a gas includes a pressure sensor configured to sense a pressure of the gas. Measurement circuitry is configured to determine the concentration of water vapor in the gas based upon the measured pressure and temperature.

Although the present invention has been described with reference to preferred embodiments, workers skilled in the art will recognize that changes may be made in form and detail without departing from the spirit and scope of the invention. The curve fit can be in accordance with any technique including polynomial curve fitting.

The process control loop 312 may be in accordance with any communication technique including wireless process control loops in which data is transmitted wirelessly such as those in accordance with the HART® communication protocol in which digital information is modulated on to a 4-20 mA current, the Foundation Fieldbus or Profibus communication protocols, etc. Process control loop 18 may also be implemented using wireless communication techniques. One example of wireless communication technique is the WirelessHART® communication protocol in accordance with IEC 62591. Other types of control loops may also be implemented including those using other physical or wireless connections including Ethernet connections or other fieldbus communication techniques. As used herein, the term measurement circuitry may include a microprocessor, sensor circuitry and/or a memory. The measurement circuitry may be implemented in a single location such as in a process variable transmitter or may be implemented in a dispersed location such as partially within a process variable transmitter and partially at a remote location such as a flow computer and a control room. Similarly, the measurement circuitry may be implemented entirely at a remote location. Although specific reference has been made to $CO_2$ in the gas, the invention is applicable to any components in the gas and not limited to the specific examples set forth herein.

What is claimed is:

1. A system for measuring and correcting flow measurements of a gas containing saturated water vapor in process piping, comprising:
   a pressure sensor configured to sense a pressure of the gas in the process piping;
   a differential pressure sensor configured to sense a differential pressure related to flow of the gas;
   a temperature sensor configured to sense a temperature of the gas in the process piping;
   measurement circuitry configured to correct flow measurements of the gas by providing flow measurements of the gas compensated for saturated water vapor in the gas based upon the measured pressure, differential pressure and temperature wherein the flow measurements of the gas are compensated for saturated water vapor by correcting a mole fraction of a dry component of the gas based on a mole fraction of water vapor, using the corrected mole fraction of the dry component of the gas to determine a molecular weight of the gas with water vapor and using the molecular weight of the gas with water vapor to produce the flow measurements of the gas compensated for saturated water vapor; and
   a monitoring system providing the compensated flow measurements of the gas.

2. The system of claim 1 wherein the pressure sensor, differential pressure sensor and temperature sensor and measurement circuitry are implemented in a process variable transmitter.

3. The system of claim 1 wherein the pressure sensor, differential pressure sensor and temperature sensor are implemented in a process variable transmitter and the measurement circuitry is implemented at a remote location.

4. The system of claim 3 wherein the measurement circuitry is in communication with the process variable transmitter through a process control loop.

5. The system of claim 1 including a memory which stores curve fitting coefficients and the measurement circuitry retrieves the curve fitting coefficients from the memory to determine the concentration of water vapor in the gas.

6. The system of claim 5 wherein the curve fitting coefficients comprise polynomial coefficients.

7. The system of claim 1 wherein the concentration of water vapor in the gas is determined using direct calculation.

8. The system of claim 1 wherein the pressure sensor, temperature and measurement circuitry are implemented in a process variable transmitter, the system further including a device for configuring the process variable transmitter by storing curve fit coefficients in a memory of the process variable transmitter.

9. The system of claim 1 including a memory to log data related to flow rate of the gas.

10. The system of claim 9 wherein the logged data includes dry gas flow rate.

11. The system of claim 9 wherein the logged data includes dry gas corrected flow rate.

12. The system of claim 11 wherein the device includes a user input for selecting desired components of the gas for which a correction factor is provided.

13. The system of claim 1 wherein the measurement circuitry determines a correction factor for a desired component in the gas.

14. The system of claim 13 including a memory which stores logged data of the correction factor into a memory.

15. The system of claim 1 including a flow restriction placed in a flow of the gas and wherein the differential pressure sensor measures a differential pressure generated across the flow restriction.

16. The system of claim 1 including a display for displaying information related to determined flow.

17. The system of claim 1 wherein the determined flow comprises mass flow rate.

18. The system of claim 1 wherein the determined flow comprises standard volume flow rate.

* * * * *